July 8, 1947.  J. U. RIDDER  2,423,468
BURR REMOVING MECHANISM
Filed Aug. 16, 1943  3 Sheets-Sheet 2
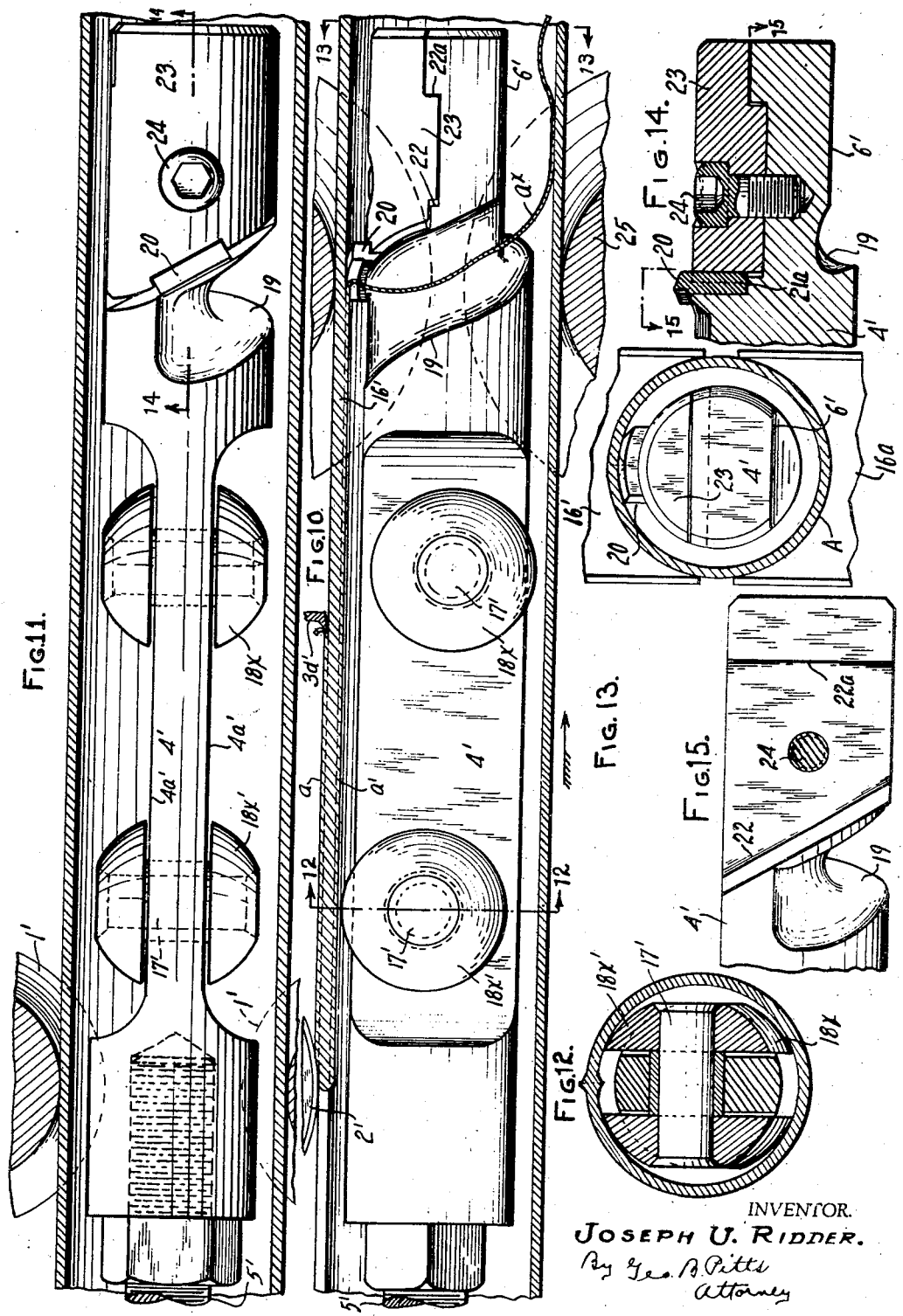
INVENTOR.
JOSEPH U. RIDDER.
By Geo. B. Pitts
Attorney

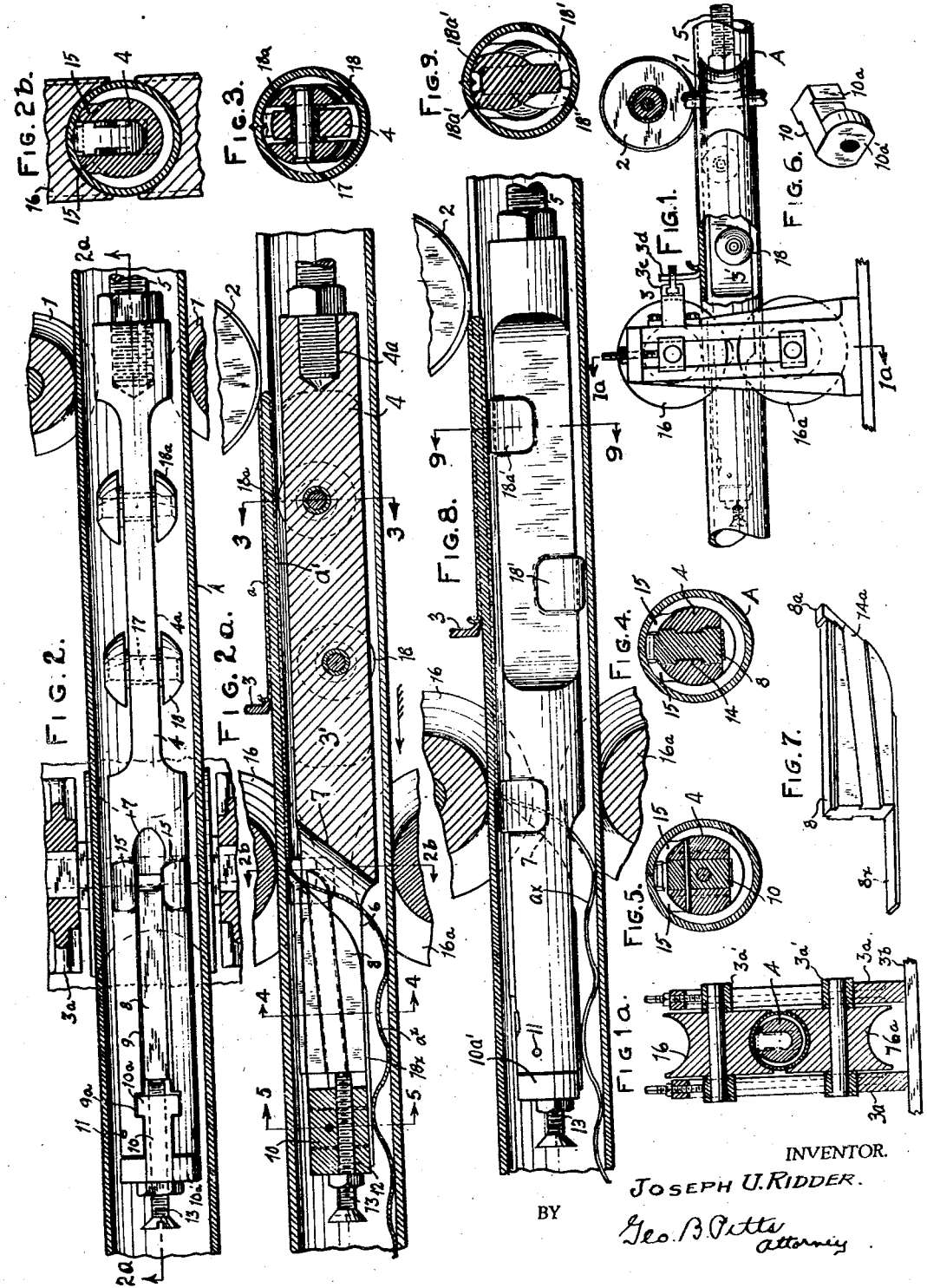

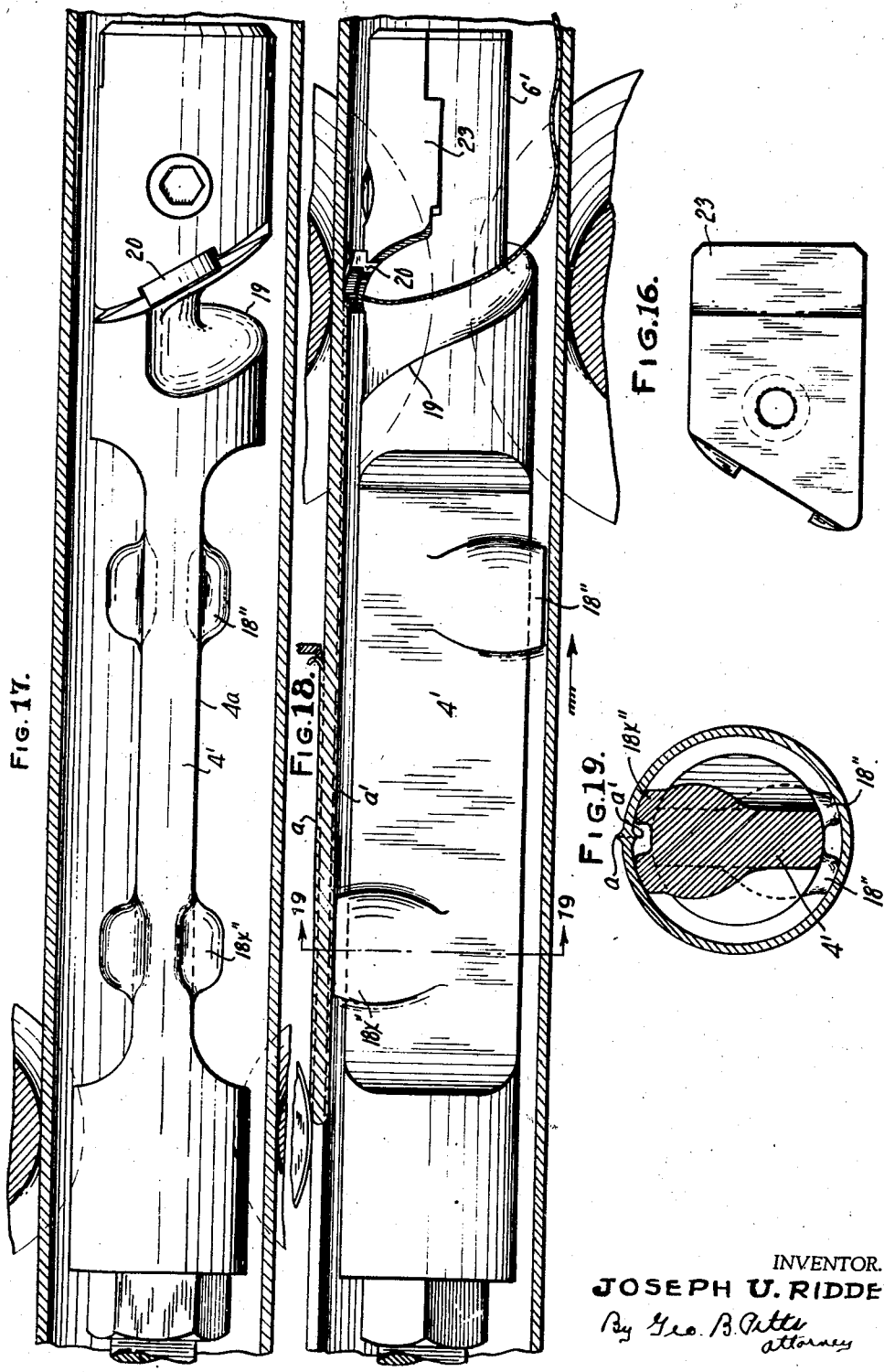

Patented July 8, 1947

2,423,468

UNITED STATES PATENT OFFICE 2,423,468

BURR REMOVING MECHANISM

Joseph U. Ridder, Lakewood, Ohio, assignor to The Yoder Company, Cleveland, Ohio, a corporation of Ohio Application August 16, 1943, Serial No. 498,894

11 Claims. (Cl. 90—24)

This invention relates to mechanism for removing from the walls of bodies burrs or beads which have resulted from a welding operation thereon. The disclosed embodiment of the invention is adapted for use in tubular articles which may be of any desired diameter and length or of indefinite length; in this latter application of the invention, it may form part of apparatus wherein sheet material is continuously fed to tube or pipe forming rolls and shaped into tubular form, the related seam edges are welded to complete the formation of the tubing and one or more additional operations are performed on the tube or pipe as the latter feeds to the point of discharge.

The welding burr on the external wall of the pipe may be readily removed, but in mechanisms for removing the burr or bead from the inner walls of pipe or tubing, of which I have knowledge, difficulty has been experienced in eliminating distortion of the tube or pipe wall and at the same time insuring uniform thickness thereof and smoothness on its inner surface. In these mechanisms, the resistance of the cutter to the moving burr in some instances would result in setting up a jittering condition leaving along the seam a rough surface which had to be passed between roll-down rollers to insure smoothness throughout the inner wall of the tube. In other instances the cutter would dig into the burr and distort or damage the wall of the tube. To avoid these conditions it has been found necessary to so adjust the cutter that only a portion of the burr was removed and to position the cutter in close relation to the welding means so that the burr or bead was hot or in a plastic state when engaging the cutter, but in this arrangement it was necessary to provide rearwardly of the cutter roll-down rollers to roll into the tube stock that portion of the burr not removed by the cutter.

One object of the invention is to provide an improved mechanism for removing the welding burr on the inner wall of a tubular article wherein danger of distorting or damaging the walls thereof due to removal of the burr is eliminated, such mechanism thereby being applicable to operation on thin walled tubular articles as well as articles having walls of substantial thickness.

Another object of the invention is to provide an improved mechanism for removing a burr from the interior wall of a tubular article in such manner that subsequent operations on the inner walls of the article to insure smoothness thereof are eliminated.

Another object of the invention is to provide an improved burr removing mechanism of this character wherein strains on the walls of the tubular article are minimized to eliminate danger of distortion thereof.

Another object of the invention is to provide an improved burr remover mechanism wherein the contiguous walls of the tubular article as they pass the burr removing tool are supported and guided relative to the tool to prevent distortion of the walls.

Another object of the invention is to provide an improved mechanism for removing the burr or bead from the inner wall of a hollow or tubular article, such mechanism having wall engaging elements and a cutter related thereto capable of removing the entire burr, whereby the inner wall of the article is made smooth and of equal thickness throughout its circumference.

Another object of the invention is to provide an improved mechanism of this character having a cutting tool and means for maintaining the walls of the tubular article in a fixed predetermined relation to the cutter during movement of the article relative thereto.

Another object of the invention is to provide an improved mechanism of this character having a cutting tool and devices related thereto and engaging the exterior and interior walls of the work for maintaining a predetermined relation of the walls relative to the cutting tool as the work moves relative thereto.

Another object of the invention is to provide in a mechanism of this character improved guide means for the removed burr to prevent clogging of the cutting tool in the area wherein the tool operates.

Other objects of the invention will be apparent to those skilled in the art to which my invention relates from the following description taken in connection with the accompanying drawings, wherein Fig. 1 is a fragmentary view of an apparatus for welding the seam edges of pipe, parts being broken away to show a burr removing mechanism embodying my invention.

Fig. 1a is a section on the line 1a—1a of Fig. 1.

Fig. 2 is a plan view of the burr removing mechanism within the pipe (enlarged), the latter being in section.

Fig. 2a is a section on the line 2a—2a of Fig. 2.

Fig. 2b is a section on the line 2b—2b of Fig. 2a.

Figs. 3, 4 and 5 are sections on the lines 3—3, 4—4, and 5—5, respectively, of Fig. 2a.

Fig. 6 is a perspective view of a detail.

Fig. 7 is a perspective view of the cutting tool.

Fig. 8 is a view similar to Fig. 2a, but showing a modified form of construction.

Fig. 9 is a section on the line 9—9 of Fig. 8.

Fig. 10 is a vertical longitudinal section of the pipe showing in side elevation a modified form of construction.

Fig. 11 is a horizontal longitudinal section of the pipe showing in plan the mechanism shown in Fig. 10.

Figs. 12 and 13 are sections on the lines 12—12 and 13—13 respectively, of Fig. 10.

Fig. 14 is a fragmentary section on the line 14—14 of Fig. 11.

Fig. 15 is a fragmentary bottom plan view of parts shown in Figs. 10 and 11 (taken on the line 15—15 of Fig. 14).

Fig. 16 is a bottom plan view of the clamping block shown in Figs. 17 and 18.

Fig. 17 is a plan view of another embodiment of the invention, the pipe being in section.

Fig. 18 is a side elevation of the parts shown in Fig. 17, the pipe being in section on the line 18—18, thereof.

Fig. 19 is a section on the line 19—19 of Fig. 18.

In the drawings, referring particularly to Figs. 1 to 7, inclusive, A indicates a portion of a preformed pipe of any desired diameter as continuously delivered from suitable roll passes (not shown), whereby the side edges of the sheet material are brought into butt relation for welding; however, the invention is not to be limited to this type of seam. The pipe A is formed of sheet material of any desired thickness. As the pipe A feeds forwardly its side walls are engaged by suitable squeeze rolls 1 so as to effect contact of these side edges at the welding station, whereby suitable electrodes 2 (only one being shown) supplied with electrical energy in a well known manner may weld the side edges together, it being understood that this kind of welding means is shown merely for illustrative purposes. The welding operation produces in most instances beads or flashes externally and interiorly of the pipe or tube A and where it is desired to furnish pipe having smooth interior and exterior walls and of predetermined uniform thickness throughout its circumference, means must be provided to remove the beads.

3 indicates as an entirety the mechanism for removing the exterior burr or bead a. This mechanism comprises spaced standards 3a mounted on a suitable support 3b rearward of the electrodes 2 and carrying on the front sides thereof a transverse member 3c having a seat for adjustably supporting a suitable tool 3d, such as a cutter, arranged to engage and sever the exterior bead from the pipe A as contiguous portions thereof more rearwardly.

3' indicates as an entirety the mechanism for removing the burr or bead or welding flash a' on the inner wall of the pipe or tube A. The mechanism 3' comprises the following: 4 indicates an elongated support within the pipe A and formed at its forward end with an inwardly extending threaded opening 4a to receive the threaded inner end of a rod 5. The rod 5 extends forwardly to a point related to the open pipe seam portion of the pipe A, for connection with a rigid supporting device (not shown) extending through the open seam, this connection serving to hold the support 4 against movement with the pipe. The rear end portion of the support 4 on its lower side is cut away, as shown at 6, this cut-away portion 6 being connected at its front end with a relatively large through opening 7 formed in the support 4 and extending downwardly and rearwardly. As will later be apparent a cutting tool 8 directs the cut-off bead material $a^x$ into the opening 7 and the space provided by the cut away 6, whereby this material may pass to this space and engage with the pipe walls and move therewith. The rear end portion of the support 4 is formed with a through slot 9 extending from the opening 7 to its outer or rear end to accommodate the tool 8 and a block 10, the side walls of the slot 9 being extended laterally as shown at 9a, to form seats for lateral extensions 10a provided on the inner end of the block 10 to prevent outward movement of the block relative to the support 4 and to hold the lateral extensions 10a' on the outer end of the block 10 against the end wall of the support 4. The block 10 is removably secured in the slot 9 by a transverse pin 11, which extends through alined openings in the support 4 and block 10. From the foregoing description it will be seen that the block 10 is fixedly supported in the slot 9. The block 10 is formed with a longitudinally extending through opening 12, the walls thereof being threaded to receive an adjusting screw 13, the inner end of which is arranged to engage the outer end of the cutting tool 8 to effect adjustment thereof and to serve as an abutment for the tool during operation thereof. Suitable guide means are provided for the tool 8 between the side walls thereof and the side walls of the slot 9, these guide means consisting of alined inclined ribs 14 provided on the opposed walls of the slot 9 and fitting ways 14a formed in the side walls of the tool 8, and arranged to guide the tool upwardly and forwardly upon operation of the screw 13, whereby its cutting edge 8a may be operatively related to the pipe wall and in the path of movement of the burr or bead a'.

Means are provided for supporting and guiding the contiguous walls of the pipe A relative to and at opposite sides of the cutting edge 8a of the tool 8, so that (a) the pipe walls will be held against deflection inwardly or outwardly to prevent distortion or damage thereto due to the operation of the tool 8 and (b) the cutting edge 8a of the tool may operate in a predetermined plane, the result being that a portion or all of the inner burr or bead a' is removed from the pipe wall according to the adjustment of the tool. Where the tool is adjusted so as to remove all of the bead a', it follows that the operation of planishing the inner wall of the pipe is eliminated and the pipe may be fed directly to the sizing rolls (if sizing is required) and a suitable cut-off mechanism (not shown). The guiding and supporting means comprise elements engaging the inner and outer walls of the pipe A, the inner elements consisting of pads 15 provided on the opposite sides of the support 4 to engage the inner wall of the pipe, the pads extending from a point forward of the burr cut-off portion to a point rearward thereof and a pressure roll 16 to engage the outer wall of the pipe in opposed relation to the pads 15 substantially in line with the tool edge 8a, and serving to maintain the contiguous walls of the pipe in engagement with the pads.

16a indicates a roll for engaging the lower side of the pipe A, this roll being preferably mounted below and in line with the roll 16 to prevent bodily deflection of the pipe A during removal of the bead a'. The shafts for the rolls 16 and 16a are mounted in pairs of journal boxes 3a' suitably supported in the standards 3a, the boxes 3a' for the shaft of the upper roll being adjustable in a well known manner to insure pressure engagement of the roll 16 with the pipe walls. As shown in Fig. 1a the surface of the pads 15 and the periphery of the roll 16 conform to the curvature of the pipe walls.

The support 4 forward of the opening 7 is provided with devices which serve to position it with respect to the inner walls of the pipe and also to maintain the pads 15 in engagement therewith and resist pressure exerted thereon through the pipe walls by the roll 16. For this purpose a portion of the support 4 rearward of the opening 7 is cut away along its lateral sides as shown at 4a and formed with spaced transverse openings 5 in which are fixedly mounted annular bearings for shafts 17 projecting at opposite sides of the support and provided with pairs of rollers 18, 18a. As shown, the shafts 17 are so mounted in the support 4 that the pair of rollers 18 engage the lower portions of the pipe A and the pair of rollers 18a engage the upper portions thereof. By mounting the rollers upon opposite sides of the support 4 the rollers 18a straddle the bead $a'$ (see Fig. 3). The pairs of rollers 18, 18a, position the support 4 with respect to the pipe walls; in addition to this function it will be noted that the rollers 18, which engage the lower portions of the pipe, are arranged intermediate the pads 15 and the rollers 18a to serve as a fulcrum, so that the rollers 18a through their engagement with the upper portions of the pipe serve to maintain the pads 15 in engagement therewith in co-active relation to the roll 16. $18x$ indicates a guard suitably fixed to the lower side of the tool 8 and extending rearwardly therefrom to prevent rough edges or ends of the burr material $a^x$ engaging portions of the block 10 and clogging up the space provided by the cut-away 6.

Figs. 8 and 9 show a modified form of construction similar to that shown in Figs. 1 to 7, inclusive, except that the positioning devices consist of pairs of spaced bearing members $18'$, $18a'$, having curvilinear surfaces with which the pipe walls slidably engage. As shown, the bearing members $18'$, $18a'$, are positioned with respect to each other, the pipe walls and the pads 15 similar to the pairs of rollers 18, 18a, respectively, so as to position the support 4 within the pipe A and maintain the pads 15 in engagement with the walls thereof at opposite sides of the tool and in opposed relation to the pressure roll 16, the members $18a'$ being spaced so as to straddle the bead $a''$ (see Fig. 9). The bearing members $18'$, $18a'$, are preferably formed integrally with the support 4.

Figs. 10 to 16, inclusive, illustrate another modification of the invention. In this form of construction, the preformed pipe A is fed to and between squeeze rolls $1'$ operatively related to suitable electrodes $2'$ which weld the side edges of the pipe and form the beads $a$, $a'$. A tool $3d'$, which is preferably mounted similarly to the tool $3d$, serves to remove the external bead $a$.

The mechanism for removing the internal bead comprises the following: $4'$ indicates as an entirety an elongated support which is connected through a rod $5'$ to an anchor or support extending through the open seam of the pipe. The support $4'$ is cut away on its lower rear portion, as shown at $6'$. The cut away $6'$ connects at its inner end with the outer end of a spiral channel 19 formed in and extending around the side wall of the support $4'$ to the upper side thereof in front of a cutting tool 20, which is disposed in the path of movement of the bead $a'$ and directs the severed bead material $a^x$ into the channel 19, whereby it may flow or move through the channel to the space provided by the cut away $6'$ for engagement with the pipe and move therewith. The tool 20 is somewhat longer than the width of the bead $a'$ and disposed at an angle inclined relative to the axis of the pipe and extending rearwardly toward that side of the support $4'$ in which the channel 19 is formed. The cutting edge of the tool 20 from end to end thereof conforms to the curvature of the inner wall of the pipe A so as to remove all of the burr or bead $a'$. The upper portion of the support at its rear end is cut away to provide a wall 21 and a shoulder $21a$ to form a seat for the cutting tool 20, and a recess having an inclined front wall 22 and a transverse rear wall $22a$ forming a seat for a block 23 having bottom walls complementary to the recess (see Fig. 16) and arranged to engage the cutting tool 20 and secure it in its seat, the block 23 being secured to the support $4'$ by a countersunk cap screw 24 extending through the block 23 and threaded into the support $4'$. The tool 20 may be adjusted vertically by the employment of one or more shims positioned between its lower end and the shoulder $21a$. $16'$ indicates a pressure roll arranged to engage the pipe A in opposed relation to the cutting tool 20 to maintain the pipe walls in operative relation to the tool. $16a$ indicates a roll engaging the lower side of the pipe A in alignment with the pressure roll $16'$ to prevent bodily distortion thereof.

The support $4'$ forward of the channel 19 is provided with devices which serve to position it with respect to the inner walls of the pipe and also to maintain the cutter 20 in fixed relation to the pipe and to resist pressure exerted thereon through the pipe wall by the roll $16'$. For this purpose a portion of the support $4'$ rearward of the channel 19 is cut away along its lateral sides as shown at $4a'$ and formed with spaced transverse openings in which are fixedly mounted annular bearings for shafts $17'$ which project at opposite sides of the support to form stud shafts provided with pairs of rollers $18x$, $18x'$. As shown, the shafts $17'$ are so mounted in the supports $4'$ that the pairs of rollers $18x$ engage the lower portions of the pipe A and the pairs of rollers $18x'$ engage the upper portions thereof. By mounting these rollers upon the opposite sides of the support $4'$ the rollers $18x'$ straddle the bead $a'$. The pairs of rollers $18x$, $18x'$, position the support $4'$ with respect to the pipe walls; in addition to this function it will be noted that the rollers $18x$ which engage the lower portions of the pipe, are arranged intermediate the cutter 20 and the rolls $18x'$ to serve as a fulcrum, so that the rollers $18x'$ through their engagement with the upper portions of the pipe serve to maintain the cutter 20 in engagement therewith in co-active relation to the roll $16'$.

Figs. 17, 18 and 19 show a modified form of construction similar to that shown in Figs. 10 to 16, inclusive, except that the positioning devices consist of pairs of spaced bearing members $18''$, $18x''$, having curvilinear surfaces with which the pipe walls slidably engage. As shown the bearing member $18''$, $18x''$, are positioned with respect to each other, the pipe walls and the cutter 20 similar to the pairs of rollers $18x$, $18x'$, so as to position the support $4'$ within the pipe A and maintain the cutter in engagement with the walls thereof, the members $18x''$ being spaced so as to straddle the bead $a'$. The bearing members $18''$, $18x''$, are preferably formed integrally with the support $4'$.

To those skilled in the art to which my invention relates many changes in construction and widely differing embodiments of the invention will be apparent without departing from the spirit and scope thereof. My disclosures and the description herein are purely illustrative and not intended to be in any sense limiting.

What I claim is:

1. A device for removing a longitudinal internal welding bead from welded pipe comprising a support within the pipe, a cutting tool fixedly mounted on the outer end portion of said support and arranged to sever the bead during movement of the pipe, longitudinally spaced elements on said support inwardly of said tool and engaging the upper and lower walls of the pipe, respectively, and transversely spaced bearing and guiding members fixed to said support at opposite sides of the cutting edge of said tool and arranged to engage the pipe walls in transverse alinement with said edge to maintain them in fixed relation thereto.

2. A device as claimed in claim 1 wherein separate means are provided for engaging the outer wall of the pipe at opposite sides of the bead in a transverse plane substantially in line with the cutting edge of said cutting tool for guiding the pipe walls relative and in fixed relation to said bearing members and the edge of said cutting tool.

3. A mechanism for removing a longitudinal internal welding bead from the interior wall of traveling pipe comprising an elongated support, devices mounted on the opposite sides of said support for positioning it with respect to the pipe walls, a cutting tool for severing the bead from the pipe wall, means for fixedly supporting said tool on said support, said support being formed with a through opening related to said tool to permit discharge of the severed bead, and separate means having a substantially fixed relation and engaging the outer and inner walls of the pipe, respectively, at opposite sides of the cutting edge of said tool and in transverse alinement with the tool edge for maintaining a fixed relation between said edge and the pipe walls during feeding of the latter.

4. A device for removing a longitudinal internal welding burr or bead from the inner wall of traveling pipe comprising a support, means connected to the inner end of said support for holding it against movement with the pipe, the outer end portion of said support being formed with a slot through which the removed bead material is discharged, a cutting tool fixedly mounted on said support with its cutting edge extending outwardly of said slot into the path of movement of the bead, combined supporting and guiding members fixedly mounted on said support at opposite sides of and in alinement with the cutting edge of said tool, inner and outer longitudinally spaced guide means on said support between said slot and the inner end of said support, the outer guide means being spaced from said slot and engaging the lower portion of the pipe wall and the inner guide means engaging the upper portion of the pipe wall and operating through said outer guide means to maintain said guiding and supporting members in engagement with the pipe walls.

5. A device for removing the longitudinal welding bead from the inner wall of traveling pipe comprising a support one end portion of which is formed with a discharge passage for the removed bead material, a cutting tool fixedly mounted on said support adjacent said passage with its cutting edge extending outwardly thereof in the path of movement of the bead, means for positioning said support with respect to the inner walls of the pipe consisting of a pair of transversely spaced devices mounted on the opposite end portion of said support and engaging the upper walls of the pipe at opposite sides of the bead and a bearing member engaging the lower portion of the pipe between said tool and said pair of spaced devices, said devices being operable through said bearing member to maintain the cutting edge of said tool in operative relation to the bead.

6. A device as claimed in claim 5 wherein is provided a roll for engaging the outer wall of the pipe in opposed relation to the cutting edge of said tool.

7. A device for removing the longitudinal internal welding bead or burr from the inner wall of traveling pipe comprising a support the rear end portion of which is formed with a spiral channel extending from its upper side rearwardly to its lower side, a cutter mounted on said support and related to the inner end of said channel and disposed in a plane at an angle inclined to the axis of the pipe in the path of movement of the bead for removing it and directing the removed bead into said channel, longitudinally spaced positioning members on said support forward of said channel for engaging the pipe walls, the inner members engaging the lower portion of the pipe and the outer members engaging the upper portions of the pipe and serving to maintain the cutter in fixed relation to the bead or burr.

8. A device as claimed in claim 7 wherein is provided a roll engaging the outer walls of the pipe in opposed relation to said cutter.

9. A device for removing a longitudinal welding bead from welded pipe comprising a support within the pipe, a cutting tool fixedly mounted on said support adjacent one end thereof and arranged to sever the bead during movement of the pipe, spaced bearing and guiding members fixedly mounted on said support at opposite sides of and in transverse alinement with the cutting edge of said tool, and longitudinally spaced devices on said support between said tool and the opposite end of said support, the device adjacent said tool engaging the lower wall of the pipe and the device remote from said tool engaging the upper wall of the pipe and co-operating with the device adjacent said tool for maintaining said members in engagement with the pipe.

10. A device as claimed in claim 9 wherein a pressure roll engages the outer wall of the pipe in opposed relation to said bearing and guiding members and a separate roll engages the outer wall of the pipe below the tool substantially in a plane perpendicular to the pipe axis cutting the cutting edge of said tool.

11. A device as claimed in claim 7 wherein the cutter is disposed at an angle inclined to the axis of pipe and the cutter edge thereof conforms to the curvature of the pipe wall.

JOSEPH U. RIDDER.

REFERENCES CITED

The following references are of record in the file of this patent:

UNITED STATES PATENTS

| Number | Name | Date |
|---|---|---|
| Re. 20,439 | Rippel | July 6, 1937 |
| 2,202,914 | Jones et al. | June 4, 1940 |
| 1,884,467 | Windsor | Oct. 25, 1942 |
| 2,025,422 | Park | Dec. 24, 1935 |
| 2,203,319 | Anderson | June 4, 1940 |
| 2,053,831 | Jenkins | Sept. 8, 1936 |
| 2,243,197 | De Fiore | May 27, 1941 |
| 2,237,550 | Darner | Apr. 8, 1941 |
| 2,305,713 | Kaplan et al. | Dec. 22, 1942 |